N. R. VAIL AND W. B. COBERLY.
APPARATUS FOR PACKING FOOD PRODUCTS.
APPLICATION FILED NOV. 24, 1917.
1,337,374.
Patented Apr. 20, 1920.
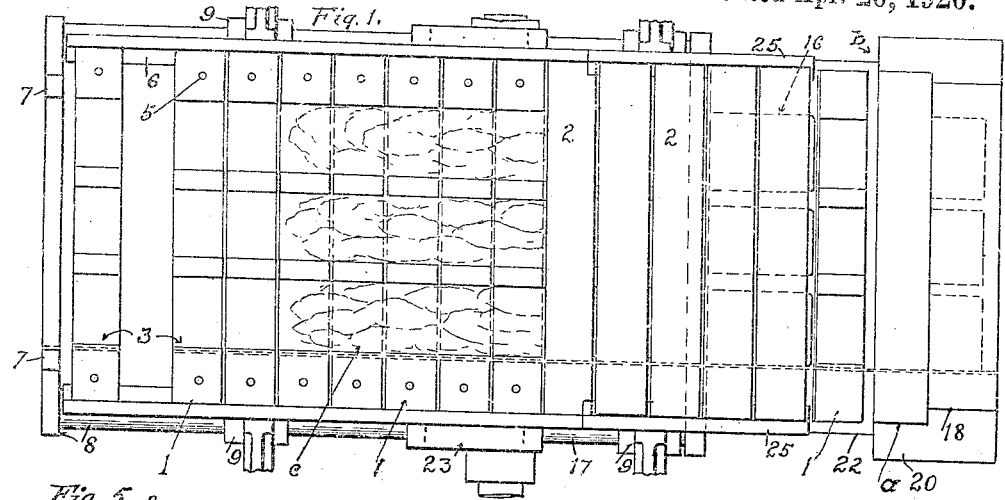
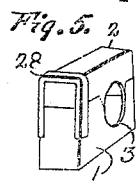
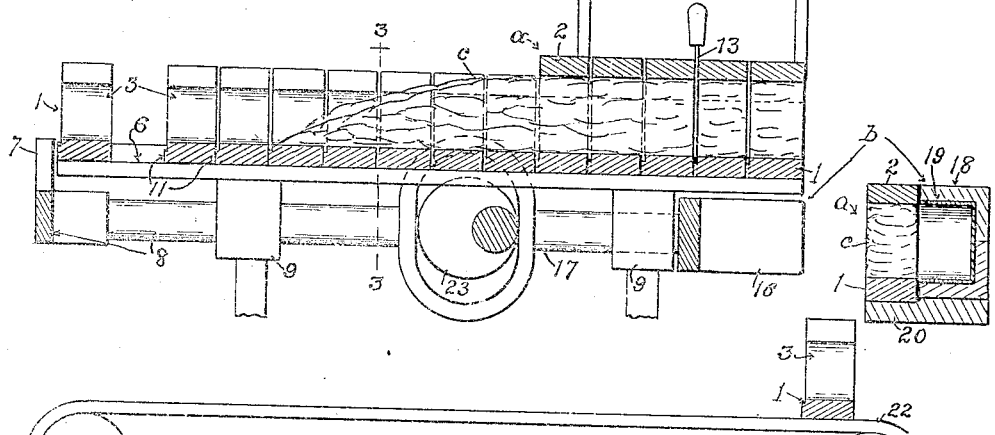
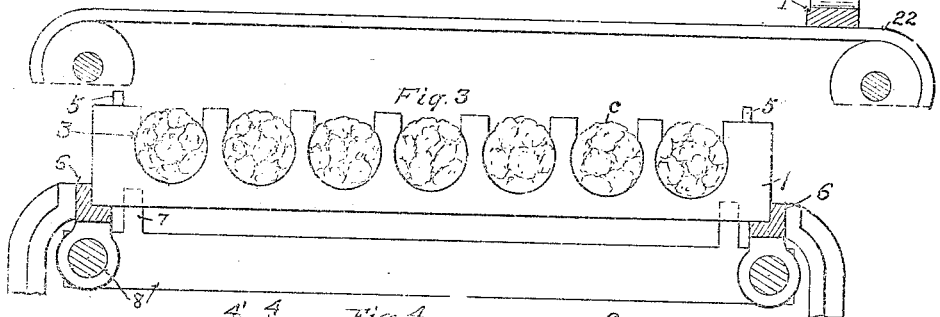
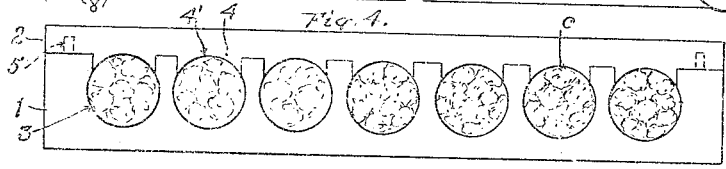
Inventors:
Nathan R. Vail
William B. Coberly
by Arthur B. Knight
Attorney

UNITED STATES PATENT OFFICE.

NATHAN R. VAIL AND WILLIAM B. COBERLY, OF LOS ANGELES, CALIFORNIA.

APPARATUS FOR PACKING FOOD PRODUCTS.

1,337,374. Specification of Letters Patent. Patented Apr. 20, 1920.

Application filed November 24, 1917. Serial No. 203,732.

*To all whom it may concern:*

Be it known that we, NATHAN R. VAIL and WILLIAM B. COBERLY, citizens of the United States, residing at Los Angeles, in the county of Los Angeles and State of California, have invented new and useful Improvements in Apparatus for Packing Food Products, of which the following is a specification.

This invention relates to the packing in cans or suitable containers of food products, such as fish, cooked meats, etc., consisting of strips or elongated pieces having a grain extending in the direction of elongation and is particularly intended for use in connection with the canning of tuna or similar fish products that require cooking before packing in the cans and are not adapted to be packed by the usual mechanical packing means. Where fish, such as tuna, has to be cooked before packing, it becomes so tender that it is not able to withstand the violent operations of mechanical packing, and such fish has heretofore been packed wholly by hand. In such particular operation it is desirable that the grain of the fish should lie substantially all in the same direction with the cut transverse faces neatly and evenly exposed when the can is opened so as to produce a marketable article.

The main object of the present invention is to provide for packing cooked fish in the most economical and expeditious manner and with a minimum of hand labor, while at the same time providing for packing the fish in the cans in the manner above stated.

The accompanying drawings illustrate apparatus suitable for carrying out our invention and referring thereto:

Figure 1 is a partly broken plan view of the apparatus.

Fig. 2 is a longitudinal section thereof.

Fig. 3 is a transverse section on line 3—3 in Fig. 2.

Fig. 4 is a side elevation of one of the clamp members or carriers hereinafter described.

Fig. 5 is a perspective view of a portion of one of the carriers, showing clamping means therefor.

While any suitable apparatus may be used for carrying out our invention we prefer to use the means shown in the drawing, and comprising carriers $a$, in which the product is packed and severed into portions, and a press means $b$, for forcing such portions into the cans or containers.

An important feature of our invention is a clamp or carrier $a$ comprising a base member 1 and a top member 2, said base member 1 being provided with a series of recesses 3 and said top member being provided with a series of projections 4 formed with concave faces 4' in such manner that when said top member is placed on said base member as shown in Fig. 4, and secured thereto by dowel 5 or otherwise, a series of cylindrical chambers will be formed thereby, adapted to receive the fish, the diameter of said cylindrical chambers being substantially equal to the interior diameter of the cans or containers to be packed, and the length of the said cylindrical chambers, which is represented by the thickness of the carrier or clamp members 1 and 2 being substantially equal to the depth of the cans or containers. Any required number of these carriers $a$ may be provided and they are manipulated in such manner that each carrier passes successively through packing, clamping, cutting and ejecting operations.

The packing, clamping and cutting operations are preferably performed while the carriers $a$ are mounted on a supporting and conveying means, adapted to support a series of such carriers and to move the same forward during the operation. For this purpose, any suitable conveying means may be used; for example, the supporting means for the carriers may be made as a movable conveyer. But for simplicity we have shown stationary rails or frame 6, provided with suitable pushing means 7 for advancing the carriers, said pushing means being, for example, formed as prongs extending upwardly from a reciprocating frame 8, mounted to slide in bearings 9 on the frame 6. Each of the base members 1 is provided with a lateral shoulder 11 which space the upper parts of the carriers apart sufficiently to permit insertion of knife means 13 therebetween. Adjacent to the delivery end of the supporting means or frame 6 is provided ejector means for forcing the plugs of fish from the chambers. Any suitable press or plunger means may be used for this purpose, either of vertical or horizontal type. For simplicity we have shown a horizontal plunger press comprising a plurality of plungers 16, reciprocated by operating means 17, and clamping means 18 for holding the cans indicated at 19 in position to receive the fish from the carrier a, the latter being supported on any suitable supporting or holding means 20 between the can-holding means 18 and the plungers 16. Sufficient space is preferably provided between said carrier supporting means 20 and the plungers 16 when the latter are in retracted position to enable the empty carrier base to be slipped down between these parts onto a return conveyer 22, whereby the carrier is moved back to the receiving end of the frame 6, or other conveying and supporting means. We have shown a cam mechanism 23 for operating the reciprocating means 8 and 17 for the conveying and ejecting devices respectively, but it will be understood that any suitable operating means may be used for these parts. Suitable means are also preferably provided for conveying or returning the top members 2 back to an intermediate part of the apparatus in position for convenient application to the base members when packed. For this purpose guide rails 25 may be mounted on each side of the machine and sufficiently above the same to permit the cutting operator reaching thereunder, said guideways being so spaced as to engage under the end portions of the top members when the latter are placed thereon.

Our invention may be carried out in the following manner, assuming that the same is applied to the packing of cooked tuna which is generally furnished in the shape of strips or elongated cuts. With the machine shown, it is desirable to provide an operator at the head or front end of the machine adjacent to the carrier advancing means 7, a packing operator at each side of the machine adjacent to the open topped carrier bases, cutters at either or both sides of the machine at the rear of the packers and a press operator at the rear end of the machine. In practice the machine may be made of sufficient width to provide packing space for a packer at each side of the machine and it will be understood that with the ordinary size of the cans, a considerably larger number of recesses may be provided in the carriers than is shown in the drawing and still provide for convenient access of the packing operator at either side to all the recesses on that side of the machine. The feed operator at the head end of the machine lifts the carrier bases, returned by the conveyer 22, from said conveyer onto the supporting frame 6 and in the reciprocating motion of the advancing means 7, the carrier bases so placed are pushed toward the delivering end of the table. The successive carrier bases pushed forward in this manner advancing in a continuous string or series, in contact at their lower portions or ends and separated at their other portions slightly, by reason of the shoulders 11 at their lower portions. The carriers are placed on the frame 6 with their recesses 3 uppermost so as to form a plurality of rows of recesses, each row of recesses forming in effect a groove. The packers place the pieces or strips of fish longitudinally in these grooves so as to substantially fill each recess with the fish material indicated at c. As each carrier reaches a certain position in its advancing movement it has thus become filled and the packing operators, or if desired, extra operators, then place a top member 2 on the base member of the carrier as it reaches this position, the projections 5 then entering the recesses 3 in such manner that the concave faces for said projections engage with the fish and press it down into the recesses 3 so as to pack it firmly therein. In case the weight of the top member is not sufficient to hold it in closed position on the base member, suitable clamping means as shown at 28 in Fig. 5 may be provided to insure such retention. As the fish is fed forward and clamped in this manner between the concave faces 4' of the top member and the walls of the recesses 3 of the base members of the carriers, said concave faces and recess forming substantially cylindrical chambers, the fish material becomes formed into bundles or elongated cylindrical masses corresponding in diameter to the cans to be packed and gripped at successive points along the mass, and with the strips extending longitudinally therein. At a certain point in the course of travel of the carriers these elongated masses of fish product are severed by cutting means, such as a knife 13, inserted and moved along in the space between successive carriers so as to sever the fish material in each carrier from the mass of fish material in the succeeding carriers, the plug of fish material then remaining in each recess of the carrier, after such severing operation thereon, corresponding in amount to that required to fill one can. As the filled carriers reach the rear end of the supporting frame 6 they are removed by the press operator or other operator to the press table 20 and the plungers 16 then operate to eject the fish material therefrom into the cans 19 suitably held in means 18 and the plungers 16 being then retracted sufficiently to permit the empty carrier base to be lowered onto return conveyer 22 and the carrier top being lifted onto the rails 25 and shoved back to convenient position for replacing on another carrier base. The filled cans are removed and replaced with empty cans, by any suitable means such as are in general use in canning machinery.

What we claim is:

1. An apparatus for packing food products, comprising a plurality of carriers, each provided with separable base and top portions formed with recesses for receiving and holding the food product, means for supporting and advancing said carriers, in position to permit of the product being assembled into the recesses in the base members while the top members are removed, and to permit of the top members being put in position to hold said product in place by continuous operation.

2. An apparatus according to claim 1, provided with means for spacing adjacent carriers, to enable insertion of a severing means between the carriers, for transversely severing the product.

3. An apparatus for packing food products, comprising a conveying means, a series of carriers removably mounted thereon, to be carried successively forward, said carriers having their lower members provided with open topped recesses adapted to receive the food product, and upper members for closing said recesses, and said carriers being spaced apart to permit of insertion of severing means between them, carrier and container holding means for receiving the carriers and holding them adjacent to suitable containers, and means for ejecting the food product from the carrier so held into the container.

In testimony whereof we have hereunto subscribed our names this 16th day of November, 1917.

NATHAN R. VAIL.
WILLIAM B. COBERLY.